US011116228B2

(12) United States Patent
Scheding (10) Patent No.: US 11,116,228 B2
(45) Date of Patent: Sep. 14, 2021

(54) LOADING METHOD

(71) Applicant: Poly-clip System GmbH & Co. KG, Hattersheim (DE)

(72) Inventor: Markus Scheding, Hochheim (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 16/861,066

(22) Filed: Apr. 28, 2020

(65) Prior Publication Data

US 2020/0337321 A1 Oct. 29, 2020

(30) Foreign Application Priority Data

Apr. 29, 2019 (EP) ..................................... 19171596

(51) Int. Cl.
*A22C 15/00* (2006.01)
*A22C 11/12* (2006.01)
(Continued)

(52) U.S. Cl.
CPC .......... *A22C 15/002* (2013.01); *A22C 11/125* (2013.01); *B65G 33/02* (2013.01); *B65G 47/61* (2013.01); *B65G 2201/0202* (2013.01)

(58) Field of Classification Search
CPC ..... A22C 15/002; A22C 11/125; B65G 33/02; B65G 47/61; B65G 2201/0202
(Continued)

(56) References Cited

U.S. PATENT DOCUMENTS 5,163,864 A * 11/1992 Burger ................. A22C 15/001
452/51
7,942,728 B2 * 5/2011 Sames .................. A22C 15/001
452/51
(Continued)

FOREIGN PATENT DOCUMENTS

DE 202006019883 U1 5/2007
EP 1891858 A1 2/2008

OTHER PUBLICATIONS

EPO; Application No. 19171596.0; Extended European Search Report dated Oct. 17, 2019.

*Primary Examiner* — James R Bidwell
(74) *Attorney, Agent, or Firm* — Fitch, Even, Tabin & Flannery LLP (57) ABSTRACT

The present invention relates to a method for removing a rod-like element from a loading position of a hanging line in which the rod-like element can successively be loaded with sausage-shaped products, each of which contain a flowable filling material in a tubular or bag-shaped packaging casing provided with a suspension element through which the sausage-shaped products can be suspended on the rod-like element in the loading position. The method comprises the steps of feeding successively sausage-shaped products to a take-up position of the hanging line at a basic feeding speed, taking up one sausage-shaped product being positioned in the take-up position, by one of several transportation elements of a transport device of the hanging line, the transportation elements circulating along a circulation path at a basic transportation speed, loading by the transportation elements a predefined number of sausage-shaped products on the rod-like element being positioned in the loading position by the transportation elements, and replacing the loaded rod-like element by an empty rod-like element after the final sausage-shaped product has been suspended on said (Continued)

rod-like element. The method further comprises the steps of varying the basic transportation speed of the transport device or the basic feeding speed, or both, after the final sausage-shaped product to be stored on the rod-like element, has been picked up by a transportation element, such that the subsequent transportation element remains empty, and setting back the varied transportation speed and/or the varied feeding speed to the basic transportation speed and/or the basic feeding speed during loading of the subsequent rod-like element.

15 Claims, 3 Drawing Sheets

(51) Int. Cl.
 *B65G 33/02* (2006.01)
 *B65G 47/61* (2006.01)

(58) Field of Classification Search
 USPC .......................................... 198/465.4, 678.1
 See application file for complete search history.

(56) References Cited

U.S. PATENT DOCUMENTS

| | | | |
|---|---|---|---|
| 10,834,931 B2* | 11/2020 | Baechtle | A22C 15/007 |
| 2003/0096568 A1* | 5/2003 | Kasai | A22C 15/001 |
| | | | 452/185 |
| 2015/0096568 A1* | 4/2015 | Grossberger | A61F 5/00 |
| | | | 128/845 |

* cited by examiner

LOADING METHOD

CROSS-REFERENCE TO RELATED APPLICATION

The present application claims the benefit of priority of European Patent Application No. 19171596.0 filed on Apr. 29, 2019, the contents of which are incorporated herein by reference in their entirety.

FIELD OF THE INVENTION

The present invention relates to a method for removing a rod-like element from a loading position of a hanging line.

In particular, the present invention relates to a method for removing a rod-like element from a loading position of a hanging line in which the rod-like element can successively be loaded with sausage-shaped products, like sausages, each of which contain a flowable filling material in a tubular or bag-shaped packaging casing provided with a suspension element, like a suspension loop, through which the sausage-shaped products can be suspended on the rod-like element in the loading position. The method can comprise the steps of feeding successively sausage-shaped products to a take-up position of the hanging line at a basic feeding speed, taking up one sausage-shaped product being positioned in the take-up position, by one of several transportation elements of a transport device of the hanging line, the transportation elements circulating along a circulation path at a basic transportation speed, loading a predefined number of sausage-shaped products on the rod-like element being positioned in the loading position by the transportation elements, and replacing the loaded rod-like element by an empty rod-like element after the final sausage-shaped product has been suspended on said rod-like element.

BACKGROUND OF THE INVENTION

In the production of sausage-shaped products, like sausages, a flowable filling material is fed by a filling machine through a filling tube of a clipping machine into a tubular packaging casing material stored on the filling tube and closed on its front end by a closure means like a closure clip. After a predetermined volume of filling material has been filled into said tubular casing material, the clipping machine closes at least the rear end of the sausage-shaped product by a further closing means via respective closing tools of the clipping machine. A suspension element, like a suspension loop, may also be attached to preferably said rear end of said sausage-shaped product, enabling the sausage-shaped product to be suspended on, for example, a smoking rod or the like. Afterwards, the tubular casing material of the sausage-shaped product just produced is separated from the remaining casing material by a cutting device of the clipping machine and is transferred out of the clipping machine by a respective discharge device for e.g. storing them on a rod-like element, like a smoking rod, in order to be able to transport the sausage-shaped products to a subsequent treatment step.

In order to enable an almost continuous production process for the sausage-shaped products, known clipping machines can be equipped with filling tube revolvers comprising at least two filling tubes. One filling tube is in the filling position, whereas the other filling tube is in a refilling position in which the tube can be filled with new packaging casing material. When the casing material of the filling tube in the filling position has been used up, only the filling tube in the refilling position equipped with the new casing material has to be turned into the filling position in order to continue the filling process and thus the manufacturing process for the sausage-shaped products. Instead of a filling tube revolver, the clipping machine can also be connected to a film sealing machine. The film sealing machine continuously produces tubular casing material from a film web.

For storing the sausage-shaped products on rod-like elements, an automated hanging line is known from EP patent application 1 891 859. In this hanging line, one rod-like element is positioned in a loading position of the hanging line. The sausage-shaped products are successively fed at a steady or constant feeding speed to a take-up position of the hanging line. In the take-up position, the suspension loop of a sausage-shaped product is picked up by one of several transportation elements of a transport device of the hanging line. The transportation elements circulate along a circulation path of the transport device at a steady or constant transportation speed. The transportation elements can be formed by hooks being attached to a conveyor chain and being able to pick up a suspension loop of a sausage-shaped product for removing the sausage-shaped product from the take-up position and to release said picked up sausage-shaped product on a predefined location on the rod-like element being positioned in the loading position of the hanging line. When the rod-like element is completely loaded, it is then moved out of the loading position by a discharge device operating also at a constant speed and an empty rod-like element to be loaded subsequently is placed in the loading position.

In this known hanging line, for exchanging a loaded rod-like element against an empty rod-like element, the feeding of sausage-shaped products to the take-up position and thus the production process for the sausage-shaped products in the clipping machine must be interrupted or at least the feeding speed must be determined as a function of the component having the slowest operating speed. If applicable, the production speed of the clipping machine must also be adapted to the operating speed of the slowest device which is usually the discharge device. Accordingly, with this known hanging line, a continuous and efficient operation for manufacturing and storing sausage-shaped products is not possible. Furthermore, the coordination of the several components involved requires an increased control effort.

Thus, it is an object of the present invention to overcome the above-mentioned drawbacks, and to provide a method for removing a rod-like element loaded with sausage-shaped products from a loading position of a hanging line, which allows an efficient feeding of the sausage-shaped products to the hanging line. Furthermore, the control effort shall be reduced.

SUMMARY OF THE INVENTION

This technical problem is solved by the claim elements of claim 1. According to the present invention, there is provided a method for removing a rod-like element from a loading position of a hanging line in which the rod-like element can successively be loaded with sausage-shaped products, like sausages, each of which contain a flowable filling material in a tubular or bag-shaped packaging casing provided with a suspension element, like a suspension loop, through which the sausage-shaped products can be suspended on the rod-like element in the loading position, the method comprises the steps of: feeding successively sausage-shaped products to a take-up position of the hanging line at a basic feeding speed, taking up one sausage-shaped product being positioned in the take-up position, by one of several transportation elements of a transport device of the hanging line, the transportation elements circulating along a circulation path at a basic transportation speed, loading by the transportation elements a predefined number of sausage-shaped products on the rod-like element being positioned in the loading position by the transportation elements, and replacing the loaded rod-like element by an empty rod-like element after the final sausage-shaped product has been suspended on said rod-like element.

The method further comprises the steps of varying the basic transportation speed of the transport device or the basic feeding speed, or both, after the final sausage-shaped product to be stored on the rod-like element has been picked up by a transportation element, such that the subsequent transportation element remains empty, and setting back the varied transportation speed and/or the varied feeding speed to the basic transportation speed and/or the basic feeding speed during loading of the subsequent rod-like element.

The principle idea of the present invention to provide an efficient method for removing a rod-like element from the loading position is to temporarily create an empty transportation element which passes the take-up position before the next sausage-shaped product to be loaded on the subsequent rod-like element is fed to the take-up position. The passage of an empty transportation element at the take-up position, after loading the current rod-like element with the predefined number of sausage-shaped products, provides a time period sufficient to exchange the loaded rod-like element just loaded by an empty rod-like element to be loaded next without the need to interrupt the feeding of sausage-shaped products to the take-up position or to determine at least the feeding speed as a function of the discharge device. After the empty transportation element has passed the take-up position, whereby the time period for replacing the loaded rod-like element with an empty rod-like element has been generated, the temporal coordination of the transportation elements relative to the sausage-shaped products provided in the take-up position is re-established so that each transportation element passing the take-up position can once again pick up a sausage-shaped product in said take-up position. This makes it possible that not only the feeding of sausage-shaped products to the take-up position is possible without interruption, i.e. continuously, but also the manufacturing process for the sausage-shaped products in the clipping machine does not have to be interrupted for the exchange of a loaded rod-like element for an empty rod-like element. Furthermore, it is not necessary to adjust the feeding speed, but also the transportation speed of the transport device of the hanging line and/or the operating speed of the clipping machine to the operating speed of the discharge device.

It is to be noted that the variation of the basic speeds for feeding and/or transporting the sausage-shaped products and the setting back of these speeds may be linear, degressive or progressive, or a combination thereof.

Creating an empty transportation element for providing a time period during which the exchange of rod-like elements in the hanging line may be executed, can be realized in different ways as explained in the following.

In a preferred embodiment of the inventive method, after the final sausage-shaped product to be suspended on the rod-like element in the loading position has been picked up by a transportation element, the basic transportation speed of the transport device is increased to an enhanced transportation speed. After the final sausage-shaped product has been suspended on the rod-like element in the loading position and the so completely loaded rod-like element has been replaced, the enhanced transportation speed is decreased to the basic transportation speed subsequently or simultaneously with the replacement operation. This allows that the basic feeding speed of the sausage-shaped products to the take-up position and, if applicable, the operating speed of the clipping machine can be maintained unchanged. In particular, the maintenance of the feeding speed prevents the sausage-shaped products from decelerating and accelerating, which can lead to a pendulous movement of the products with the risk that the products touch each other and thus damage each other.

In a further preferred embodiment of the inventive method, the enhanced transportation speed of the transport device is decreased during loading of a predefined number of sausage-shaped products onto the next rod-like element to be loaded. The predefined number of sausage-shaped products, during their feeding the enhanced transportation speed of the transport device is decreased, depends on different aspects and parameters, like parameters of the sausage-shaped products, such as their weight and size, or the value of the basic transportation speed. In other words: in the case that large and heavy sausage-shaped products are to be handled by the hanging line, the decrease of the enhanced transportation speed to the basic transportation speed can be done during the complete loading process, in order to avoid an abrupt change in transportation speed causing pendulous movement of the sausage-shaped products to be transported. On the other hand, in the case that small and lightweight sausage-shaped products are to be handled, the reduction of the enhanced transportation speed to the basic transportation speed can be executed after a shorter time period, like 50% of the loading time.

The amount of increase of the basic transportation speed to the enhanced transportation speed can be determined on the basis of one or more different criteria. For example, it is possible to determine the amount of increase in the basic transportation speed to the enhanced transportation speed as a function of the distance between the transportation elements of the transport device or on the basis of the basic feeding speed, respectively. This makes it possible to adapt the method according to the invention to hanging lines with differently designed transport devices or devices for feeding the sausage-shaped products to the take-up position.

A further possibility, or one which supplements the possibility described above to determine the amount of increase in the basic transportation speed to the enhanced transportation speed, is to use predefined values. These values can be stored, for example, in a table as absolute values or as ratio values. Additionally, or alternatively, these values can be linked to one or more different criteria. Criteria can be, for example, the weight and/or length of the sausage-shaped products and/or the feeding speed and/or the operating speed of the clipping machine. In particular, it is possible to increase the basic transportation speed of the transport device to the enhanced transportation speed by about 10% to 50%, preferably by about 20% to 40% and further preferably by about 30% of the basic transportation speed.

Another way of temporarily generating an empty transport element is that, after the final sausage-shaped product to be suspended on the rod-like element in the loading position has been picked up by a transport element, the basic feeding speed is decreased to a reduced feeding speed. After the final sausage-shaped product has been suspended on the rod-like element in the loading position and the so completely loaded rod-like element has been replaced, the reduced feeding speed is increased to the basic feeding speed subsequently or simultaneously with the replacement operation. Since the feeding of the sausage-shaped products only requires the conveying of the products themselves, whereas the transport of the sausage-shaped products in the hanging line by the transport device requires not only the movement of the products themselves, but also the movement of the transportation elements, which leads to an increased inertia compared to the mere feeding of the products in response to a speed change, this option allows a faster response to the speed change. This option can be used in conjunction with the above-mentioned possibility for temporarily generating an empty transport element by increasing the basic transportation speed, or alternatively thereto.

Similar to the option to increase the basic transportation speed to the enhanced transportation speed, the amount of decrease of the basic feeding speed to the reduced feeding speed can be determined on the basis of one or more different criteria. For example, it is possible to determine the amount of decrease in the basic feeding speed to the reduced feeding speed as a function of the distance between the transportation elements of the transport device or on the basis of the basic transportation speed or on the size of the transportation elements, respectively. This makes it possible to adapt the method according to the invention to hanging lines with differently designed transport devices or devices for feeding the sausage-shaped products to the take-up position.

A further possibility, or one which supplements the possibility described above to determine the amount of decrease in the basic feeding speed to the reduced feeding speed, is to use predefined values. These values can be stored, for example, in a table as absolute values or as ratio values. Additionally, or alternatively, these values can be linked to one or more different criteria. Criteria can be, for example, the weight and/or length of the sausage-shaped products and/or the feeding speed and/or the operating speed of the clipping machine. In particular, it is possible to decrease the basic feeding speed to the reduced feeding speed by about 10% to 50%, preferably by about 20% to 40% and further preferably by about 30% of the basic feeding speed.

The time at which the basic transportation speed or the basic feeding speed, or both, is varied is after the final sausage-shaped product to be suspended on the rod-like element in the loading position has been picked up from the take-up position. The time may be immediately after the pick-up of the product or delayed. The longest possible time period for replacing the loaded rod-like element with an empty rod-like element is achieved by varying of either or both the basic transportation speed and the basic feeding speed immediately after the final sausage-shaped product to be stored on the rod-like element in the loading position has been picked up.

Similar to the time for varying the basic transportation speed or the basic feeding speed, or both, the time for setting back the enhanced transportation speed or the reduced feeding speed, or both, to their basic speeds is after the empty rod-like element has been placed in the loading position. The time may start immediately after the exchange of the rod-like elements or with a delay. The longest possible time period for setting back the enhanced transportation speed or the basic feeding speed, or both, is achieved by setting back of either or both of the varied transportation speed and the varied feeding speed to the basic transportation speed and/or the basic feeding speed immediately after the loaded rod-like element has been replaced against an empty rod-like element, and up to a time point immediately before the final sausage-shaped product to be stored on the rod-like element in the loading position has been picked up.

This reduces the risk that too strong acceleration of the sausage-shaped products to be fed or too fast reduction of the speed of the transportation elements will cause the products to oscillate with the risk of damage of the products.

As already mentioned above, an empty transportation element may be created by varying the speed of the transport device only. In this case, it is of advantage that the feeding speed remains constant during the whole loading process. However, it may further be of advantage, that the feeding speed may vary during the loading process in accordance with the varying transportation speed of the transport device. This may allow a specific adaption of the loading process to specific products or to specific features of the hanging line, like the length of the rod-like elements to be loaded, or the specific design of the transport device and/or the device for feeding the sausage-shaped products to the take-up position.

It is of further advantage when, before starting the loading operation, the basic feeding speed and/or the basic transportation speed is set to a predefined basic feeding speed and/or a predefined basic transportation speed, preferably in accordance with the kind of sausage-shaped product to be loaded on the rod-like element.

In order to reduce the control effort for all devices, i.e. a hanging line, a feeding device, if present, and/or a clipping machine, it is preferred that the basic feeding speed of the sausage-shaped products to the take-up position of the hanging line and the basic transportation speed of the transport device is synchronized with the production speed of a clipping machine arranged upstream the hanging line. For this purpose, a control device can be provided which controls at least the transportation speed of the transport device and the feeding speed.

The feeding of the sausage-shaped products to the take-up position can take place in different ways. For example, the sausage-shaped products discharged from the clipping machine can reach the take-up position immediately afterwards. In order to keep the flexibility of the manufacturing process as high as possible, it is also possible that an infeed device is provided with which sausage-shaped products are successively fed to the take-up position of the hanging line.

Further advantages and preferred embodiments of the present invention will be described in the following together with the drawings listed below. The expressions "left", "right", "below" and "above" used in the following description, are referred to the drawings in an alignment such that the reference numbers and the notation of the figures used can be read in normal orientation.

DETAILED DESCRIPTION

Figure 1:
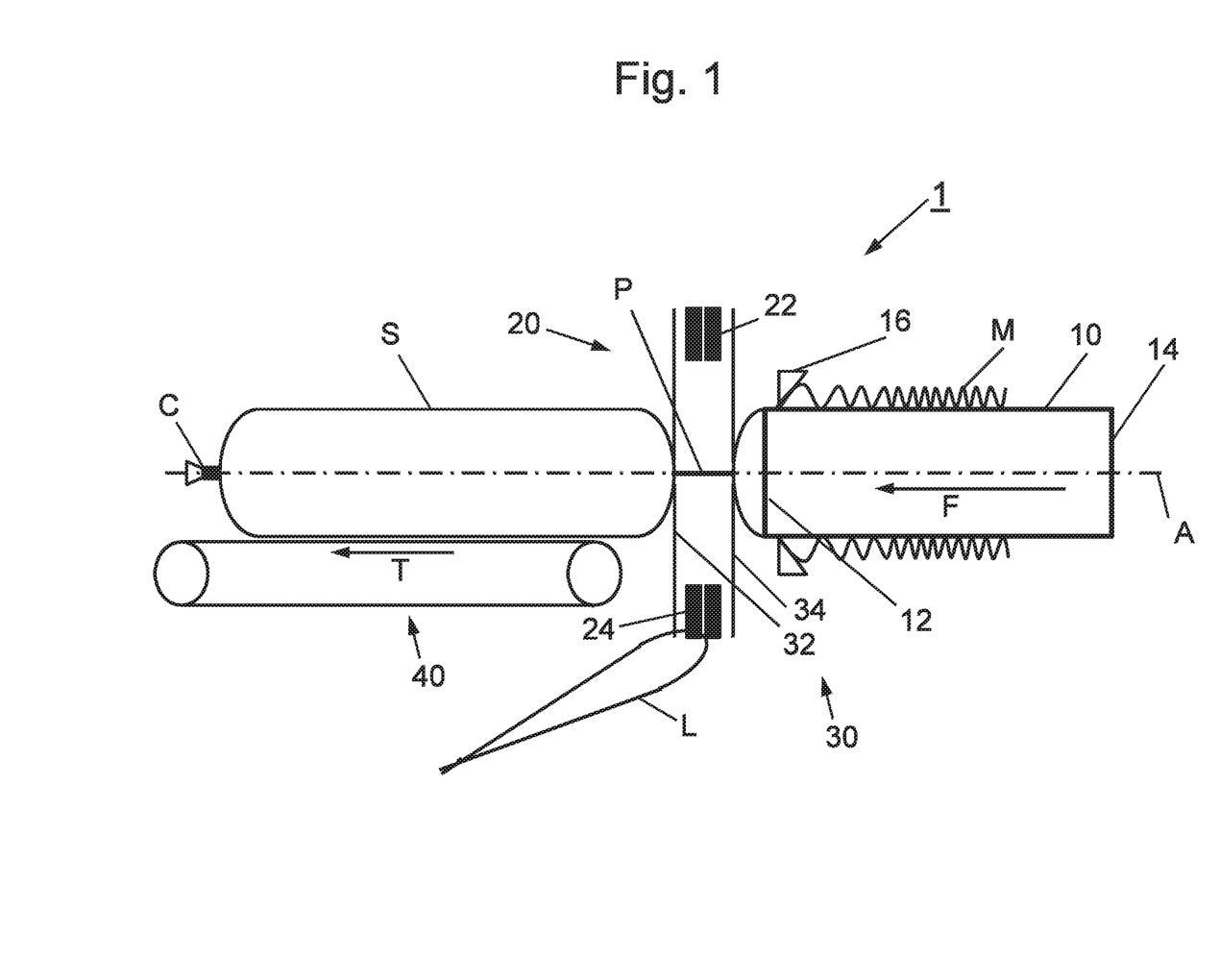
FIG. 1: is a schematic view showing the principal design of a clipping machine for producing sausage-shaped products.

A clipping machine 1 for producing sausage-shaped products S, like sausages, which contain a flowable filling material in a tubular or bag-shaped packaging casing M, is shown schematically in FIG. 1, in particular its closing region. Clipping machine 1 comprises a filling tube 10 having a longitudinally and horizontally extending central axis A, with a discharge opening for discharging the filling material at its left end 12 and a feeding opening for feeding the filling material in a feeding direction F to the discharge opening of filling tube 10, for example by a feeding pump (not shown), at its right end 14. Moreover, a casing brake assembly 16 is arranged on and coaxially with filling tube 10 in the region of left end 12 of filling tube 10. Filling tube 10 is made of a suitable material, like stainless steel.

A supply of tubular packaging casing M made of a thin sheet material is stored on filling tube 10 in a folded manner like a concertina. From the supply of tubular packaging casing material M, tubular packaging casing M is pulled-off during the process of producing the sausage-shaped products S, in particular by the feeding pressure for filling the filling material into tubular packaging casing M wherein casing brake assembly 16 provides a braking force for allowing a controlled pulling-off of casing material M during the filling process.

Clipping machine 1 further comprises a clipping device 20 for closing a filled tubular packaging casing M by applying closure means, like closure clips or closing clips C, to a plait-like portion P, and gathering means 30 for gathering the filled tubular packaging casing M and forming said plait-like portion P thereto. These components are all arranged downstream filling tube 10.

As can be inferred from FIG. 1, clipping device 20 is positioned immediately downstream left end 12 of filling tube 10, and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing the rear end of the just filled tubular packaging casing M, or may apply and close two closure clips C at the same time, a first closure clip C for closing the rear end of the just filled tubular packaging casing M for forming a sausage-shaped product S, and a second closure clip C for closing the front end of a tubular packaging casing M subsequently to be filled.

Gathering means 30 include a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P. First displacer unit 32 can reversibly be moved parallel to feeding direction F of the filling material.

If it is intended to store the sausage-shaped products S on a rod-like element R (cf. FIG. 2), like a smoking rod, e.g. for further processing like cooking or smoking, a suspension element L, like a suspension loop, may be provided and attached to one end of each of the sausage-shaped products S, preferably the rear end, or at one end of a chain of sausage-shaped products S, once again preferably the rear end. Suspension element L may be fed to one of clipping tools 22, 24, and may be fixed to the respective end of sausage-shaped product S by means of the closure clip C which closes said end of sausage-shaped product S.

For discharging a sausage-shaped product S just produced from clipping machine 1 in a transportation direction T being substantially the same as feeding direction F, a discharge device 40 is arranged downstream clipping device 20, which may be a belt conveyor comprising a conveyor belt and guide rollers. In a simple case, discharge device 40 may be a chute. When discharging sausage-shaped products S just produced, suspension element L is caught by a catching device, like a catching needle, which guides suspension element L towards the rod-like element R.

Figure 2:
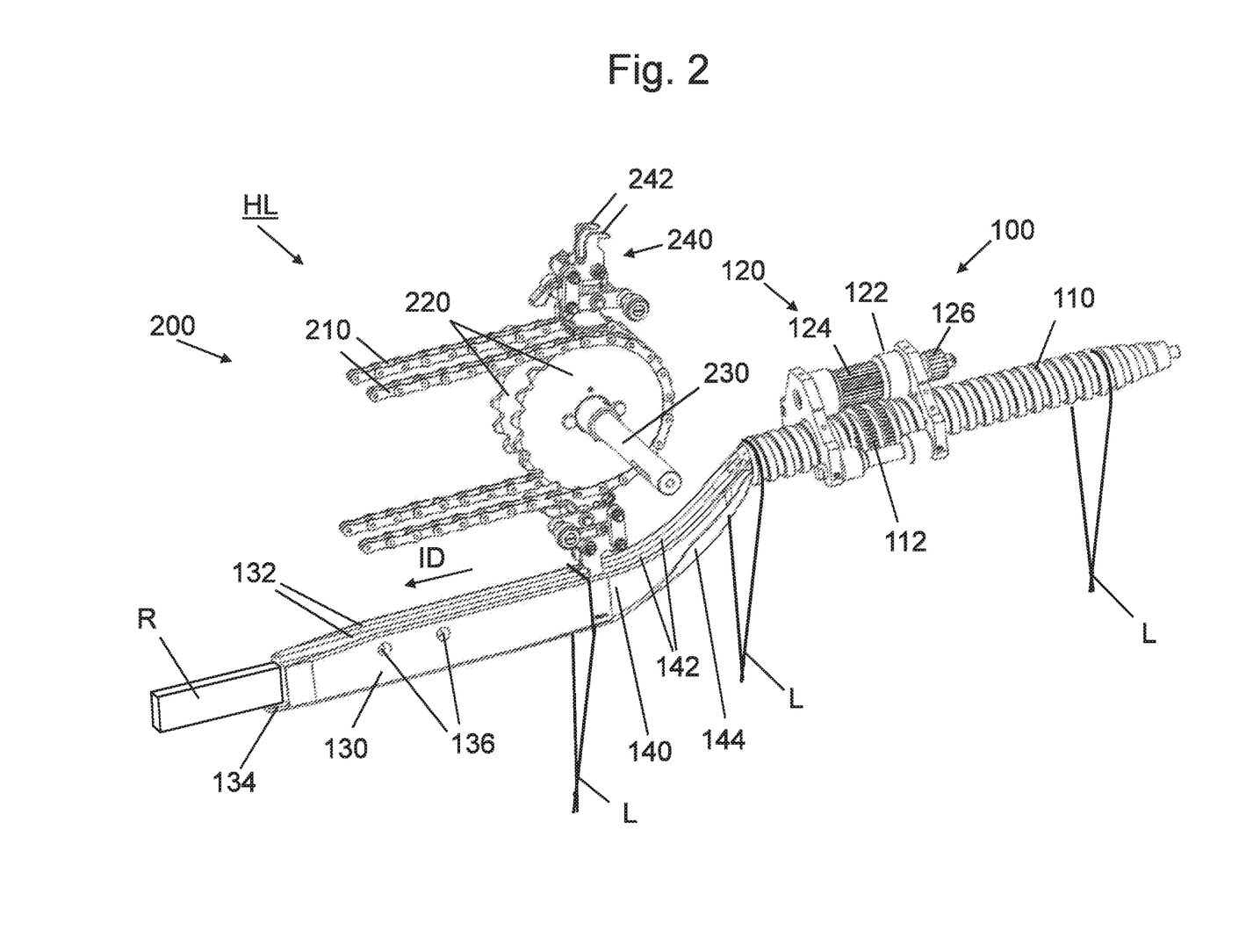
FIG. 2: is a perspective view to main components of a hanging line in which the method according to the present invention may be executed.

For suspending a sausage-shaped product S on a rod-like element R, said sausage-shaped product S is carried out of clipping machine 1 and fed to a hanging line HL, the main components of which are shown in FIG. 2. Hanging line HL includes amongst others, an infeed device 100 and a transport device 200.

Infeed device 100 includes an actively driven infeed conveyor in the form a spindle 110 with an outer surface at least similar to a screw thread, that is supported by a spindle bearing 120, a guide bar 130 and a connecting element 140 connecting the downstream end of spindle 110 with the upstream end of guide bar 130. Connecting element 140 has the shape of a segment of a circle, at least at its upper surface.

The upstream end of connecting element 140 has an approximately circular cross-section adapted to the cross-section of screwed spindle 110, to allow a sliding transfer of a suspension element L from screwed spindle 110 onto connecting element 140. The downstream end of connecting element 140 has an at least approximately rectangular shape adapted to the cross-sectional shape of guide bar 130.

In the upper surface of connecting element 140, two parallel grooves 142 are arranged, which extend in an infeed direction ID. Also, in the upper surface of guide bar 130, two parallel grooves 132 are arranged, which extend in infeed direction ID, and which are aligned with grooves 142 in connecting element 140.

A portion of the surface of screwed spindle 110 has a toothed surface 112 which is engaged by a toothed portion 124 of a support roller 122 of spindle bearing 120. At a free end of support roller 122, a toothed wheel 126 is arranged, via which support roller 122 may be rotated, for driving screwed spindle 110 at a desired speed. As a drive for infeed device 100, an electric motor or the like can be provided.

For supporting guide bar 130, holes 136 are provided in both side surfaces of guide bar 130, into which indexing pins of an indexing device may engage. At its upstream end, guide bar 130 is fixedly coupled to connecting element 140. The upstream end of connecting element 140 is radially supported by screwed spindle 110. Connecting element 140 has an engaging element, like a pin, at its upstream end that extends into the downstream end of spindle 110, in which it is rotatably supported, e.g. in a roller bearing, for enabling a rotational movement of screwed spindle 110 relative to connecting element 140. Pairs of oppositely arranged indexing pins which may engage holes 136 in guide bar 130 provide radial and rotational support for guide bar 130, and enable passage of suspension elements L along guide bar 130, by pairwise alternatingly engaging and disengaging holes 136 in guide bar 130.

The longitudinal edges 144 of connecting element 140, which extend along its lower surface, are cut away, as can be seen in FIG. 2, particularly, in the region of the upstream end of connecting element 140. These cutaways reduce the cross-sectional area in a vertical plane perpendicularly arranged to the longitudinal axis of screwed spindle 110. The reduction of the cross-sectional area prevents suspension elements L sliding from screwed spindle 110 along connecting element 140 towards guide bar 130, from sticking in this region of connecting element 140.

A support element 134 extends from guide bar 130, for supporting a rod-like element R to be loaded with sausage-shaped products S. The other end of rod-like element R (not shown) is also supported so that rod-like element R is held horizontally aligned at its two ends during product loading. A suspension element L guided along guide bar 130 may thereby be transferred onto said rod-like element R. The upstream end of rod-like element R is supported on support element 134, such that rod-like element R in the loading position shown in FIG. 2, and guide bar 130 are arranged approximately coaxially.

In FIG. 2, only an upstream portion of rod-like element R and the suspension elements L of the sausage-shaped products S are shown, with the suspension elements L representing the sausage-shaped products S to be transported along infeed device 100.

A further component of hanging line HL is transport device 200 for transporting the sausage-shaped products S fed by infeed device 100, along rod-like element R and placing said sausage-shaped products S thereon.

Transport device 200 is arranged vertically above guide bar 130, and extends in infeed direction ID. Transport device 200 is embodied as a chain conveyor forming the conveyor means having two endless conveyor chains 210 which are arranged parallel to each other, and with each conveyor chain 210 being wound about a first and a second deflection roller 220. In FIG. 2, only first deflection rollers 220 are shown, which are arranged on a common axle 230. First deflection rollers 220 form the upstream end of horizontally arranged transport device 200. The (not shown) downstream end of transport device 200 is of identical constitution, and includes two second deflection rollers about which conveyor chains 210 are wound, and which are also arranged on a common axle 230.

Transport device 200, and particularly conveyor chains 210 are actively driven by one of its common axles 230 of the deflection rollers 220 via, for example, an electric motor. Transport device 200 is driven such that the lower run of conveyor chains 210 moves in infeed direction ID.

Transportation elements 240 are arranged in regular intervals on conveyor chains 210. Each transportation element 240 includes a pair of hooks 242, with each hook 242 engaging one of grooves 132, 142 of guide bar 130 and connecting element 140 for engaging a suspension element L of a sausage-shaped product S to be suspended on a rod-like element R.

In FIG. 2, the leftmost suspension element L is in the region of the take-up position at the upstream end of guide bar 130. For clarification matter only, the middle suspension element L is shown in a position at the downstream end of screwed spindle 110, where, by further rotation of screwed spindle 110, said suspension element L will be transferred onto connecting element 140, and further slide along connecting element 140 by gravity, into the take-up position to be picked up by the subsequent transportation element 240 which, in FIG. 2, is positioned vertically above common axle 230. With the leftmost suspension element L in the take-up position, middle suspension element L has a distance to the downstream end of spindle 110, such that said middle suspension element L is transferred onto connecting element 140 immediately before subsequent transportation element 240 passes the upstream end of connecting element 140.

The length of transport device 200 is selected such that the lower run of conveyor chains 210 extends at least from the upstream end of guide bar 130 up to the downstream end of rod-like element R to be loaded with sausage-shaped products S. Furthermore, in order to ensure a safe pick up of a suspension element L by a transportation element 240, the central axis of axle 230 coincides with the centre of the circle segment formed by the upper surface of connecting element 140.

For loading rod-like element R with a predefined number of sausage-shaped products S, the rotation speed of screwed spindle 110 of infeed device 100 and the transportation speed of transport device 200 are synchronized such that, after a suspension element L of a sausage-shaped product S, positioned in the take-up position, has been picked up by a transportation element 240, suspension element L of subsequent sausage-shaped product S is in a position at the downstream end of screwed spindle 110, as shown in FIG. 2. In this position, suspension element L of subsequent sausage-shaped product S may be transferred to the take-up position, for securely being taken up by subsequent transportation element 240.

After a rod-like element R has been loaded with a predefined number of sausage-shaped products S, said loaded rod-like element R is moved out of the loading position, and an empty rod-like element R to be loaded next is placed in the loading position.

Figure 3:
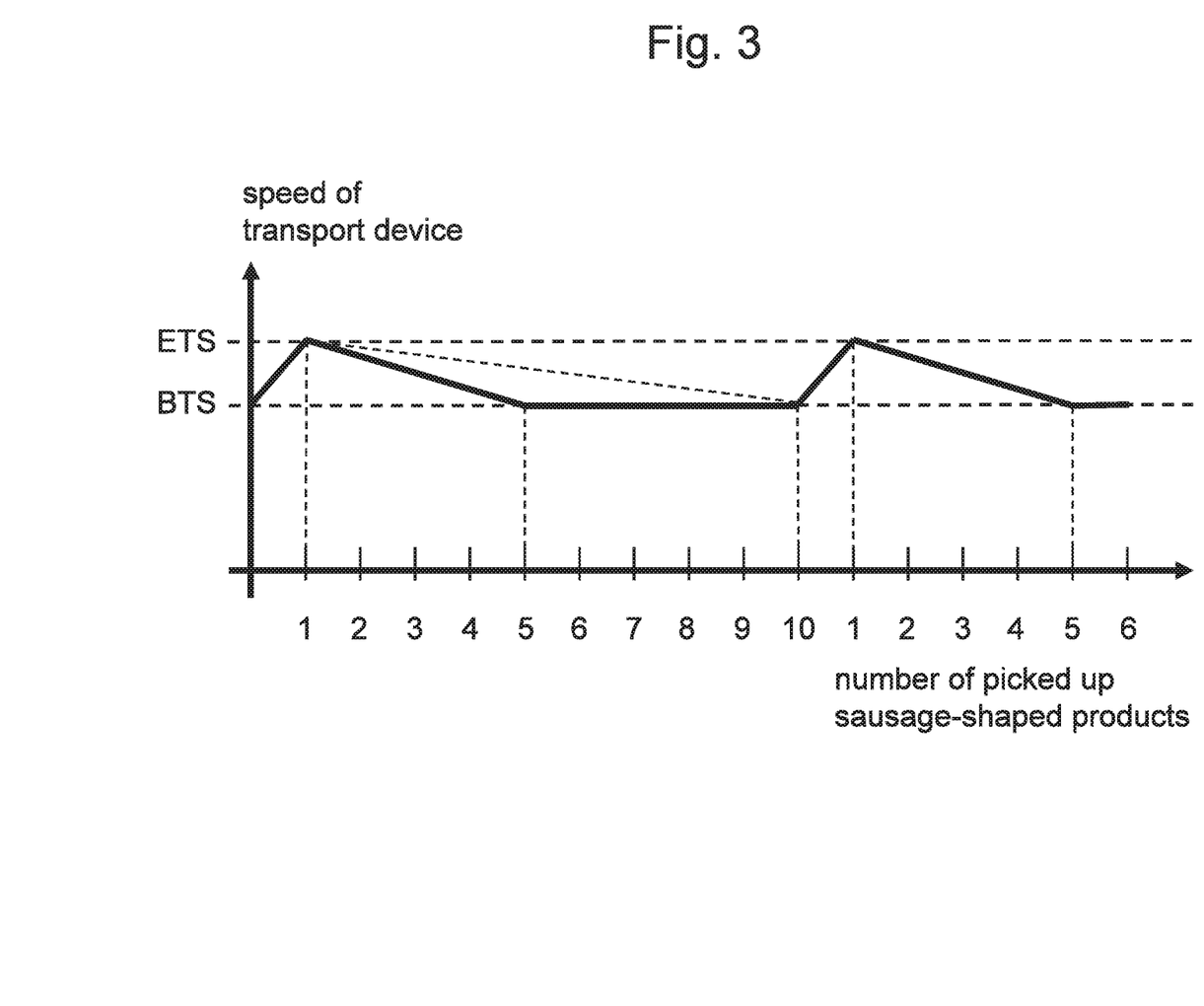
FIG. 3: is an exemplary speed profile of the transport device, according to the method of the present invention.

In order to allow a secure exchange of a loaded rod-like element R by an empty rod-like element R, at least the speed of transport device 200 is varied as exemplarily shown in FIG. 3.

According to the example of FIG. 3, a rod-like element R has to be loaded with ten sausage-shaped products S. Thereafter, loaded rod-like element R is moved out of the loading position, and replaced by an empty rod-like element R.

Transport device 200 has a basic transportation speed BTS which corresponds with a basic feeding speed of screwed spindle 110 of infeed device 100.

The transport device 200 may be operated at a steady or constant speed during transporting the sausage-shaped products S to their storage places on the respective rod-like element R, and the infeed device 100 may be operated at a corresponding constant feeding speed, at least during a period of the loading time. These speeds are the basic transportation speed BTS and the corresponding basic feeding speed. In the case that the variation of the basic transportation speed BTS and/or the basic feeding speed, and the setting back of the varied transportation speed and/or the varied feeding speed takes place over a complete loading process for loading a rod-like element R, the speed of the transport device 200 and the speed of the feeding device which are varied, and to which the varied speed is set back, are the basic transportation speed BTS and the corresponding basic feeding speed.

As can be seen in FIG. 3, after the tenth sausage-shaped product S has been taken up by a respective transportation element 240, the basic transportation speed BTS of transport device 200 is increased to an enhanced transportation speed ETS. The acceleration phase starts immediately after the final sausage-shaped product S to be stored on rod-like element R has been picked up, and, dependent on the degree of acceleration, takes a maximum time interval which corresponds to the delivery interval of infeed device 100 necessary for feeding the next sausage-shaped product S, in order to ensure that the subsequent transportation element 240 remains empty. However, it may be sufficient that the time interval or the length of the acceleration phase takes a minimum time, for ensuring that the subsequent transportation element 240 has passed the upstream end of connecting element 140 before the suspension element L of the first sausage-shaped product S has been transferred onto connecting element 140.

Due to the fact that basic transportation speed BTS of transport device 200 has been increased to enhanced transportation speed ETS after taking up the tenth sausage-shaped product S, subsequent transportation element 240 has already passed the take-up position before suspension element L of next sausage-shaped product S has reached the take-up position. Thus, an empty transportation element 240 is moved through hanging line HL.

Particularly, due to the acceleration of basic transportation speed BTS of transport device 200, empty transportation element 240 has passed the upstream end of connecting element 140 of infeed device 100, before suspension element L of sausage-shaped product S to be loaded first to empty rod-like element R, has been transferred from the downstream end of screwed spindle 110 of infeed device 100 to connecting element 140. The middle suspension element L shown in FIG. 2 is in such a position immediately before being transferred onto connecting element 140.

The passage of an empty transportation element 240 after current rod-like element R has been loaded with the predefined number of sausage-shaped products S, provides a time period sufficient to exchange loaded rod-like element R by an empty rod-like element R to be loaded next.

The acceleration of transport device 200 causes transportation element 240 which (in the example shown in FIG. 3) follows the tenth transportation element 240, to move faster such that the movement path of following transportation element 240 is longer compared with the movement path of a transportation element 240 when moved with basic transportation speed BTS. The degree of acceleration, and thus, the value of enhanced transportation speed ETS, is selected such that the difference in the length of the moving paths of tenth transportation element 240 and subsequent transportation element 240 matches at least the width of hooks 242 of transportation elements 240. Thus, subsequent transportation element 240 has passed suspension element L of first sausage-shaped product S to be stored on empty rod-like element R.

However, the degree of acceleration may also be selected such that the difference in the length of the moving paths of tenth transportation element 240 and subsequent transportation element 240 is larger than the width of hooks 242 of transportation elements 240.

After suspension element L of first sausage-shaped product S to be stored on empty rod-like element R, the speed of transport device 200 is reduced from enhanced transportation speed ETS to basic transportation speed BTS. The degree of deceleration of enhanced transportation speed ETS of transport device 200 is selected such that basic transportation speed BTS is reached after a predefined number of sausage-shaped products S has been suspended on rod-like element R, or a specific sausage-shaped product S has been picked up from the take-up position. According to the embodiment shown in FIG. 3, basic transportation speed BTS is reached after the fifth of ten sausage-shaped products S to be stored on rod-like element R has been picked up.

As explained above, caused by the acceleration of transport device 200 from basic transportation speed BTS to enhanced transportation speed ETS, subsequent transportation element 240 has passed suspension element L of first sausage-shaped product S to be stored on empty rod-like element R. The advance of said subsequent transportation element 240 matches at least the width of a hook 242 of transportation element 240.

Transportation element 240 taking up suspension element L of first sausage-shaped product S to be stored on empty rod-like element R, and which follows empty transportation element 240, has a lag relative to the provision of suspension element L to be taken up by said transportation element 240. In other words, after suspension element L of said first sausage-shaped product S is provided in the take-up position, transportation element 240 which has to take up said suspension element L is not directly behind said suspension element L, but has still to be moved about a distance before reaching suspension element L in the take-up position.

The length of said distance or lag corresponds to the difference between the distance of two subsequently arranged transportation elements 240 and the advance of empty transportation element 240 caused by the acceleration of transport device 200.

It has to be noted that, during loading the predefined number of sausage-shaped products S with decreasing transportation speed, transportation elements 240 run at a higher speed than basic transportation speed BTS. This higher speed allows to catch up the lag of transportation elements 240 to suspension elements L to be taken up.

According to FIG. 3, the deceleration of the enhanced transportation speed ETS of transport device 200 has selected such that basic transportation speed BTS is reached when the fifth of ten suspension elements L has been picked up. In general, the degree of deceleration has to be selected such that there is no lag between first transportation element 240 running at basic transportation speed BTS and suspension element L to be picked up by said transportation element 240.

It has further to be noted that the degree of deceleration of enhanced transportation speed ETS of transport device 200 to basic transportation speed BTS depends on various factors, like the total number of sausage-shaped products S to be stored on a rod-like element R, the values of basic transportation speed BTS, which corresponds to basic speed of infeed device 100, and/or enhanced transportation speed ETS, accordingly, which is necessary for reaching a respective advance of a transportation element 240 to remain empty.

Also, the value of enhanced transportation speed ETS is dependent on various factors, like the value of basic transportation speed BTS and/or the total number of sausage-shaped products S to be loaded on a rod-like element R.

It has further to be noted that the degree of deceleration of enhanced transportation speed ETS of transport device 200 to basic transportation speed BTS has to be selected such that at least when suspension element L of last sausage-shaped product S to be stored on current rod-like element R to be loaded is picked up by a respective transportation element 240, transport device 200 runs at basic transportation speed BTS (as shown by the dotted line in FIG. 3).

As explained in conjunction with the exemplary embodiment of FIG. 3, according to which a rod-like element R has to be loaded with ten sausage-shaped products S, the acceleration and deceleration of the speed of transport device 200 is selected such that eleven transportation elements 240 pass the take-up position, instead of ten transportation elements 240, when running at basic transportation speed BTS. Thereby, "eleventh" transportation element 240 remains empty, and additional time is provided for exchanging loaded rod-like element R by an empty rod-like element R.

It is one of the general ideas of the present invention to accelerate transport device 200 from basic transportation speed BTS to enhanced transportation speed ETS immediately after last sausage-shaped product S to be stored on rod-like element R currently to be loaded has been picked up, and to decelerate transport device 200 from enhanced transportation speed ETS to basic transportation speed BTS during the following loading procedure. Thereby, between the loading procedures of two rod-like elements R subsequently to be loaded, an empty transportation element 240 passes the take-up position, for providing additional time, which allows a secure exchange of a loaded rod-like element R by an empty rod-like element R. In other words, during a loading procedure according to the present invention, the number of transportation elements 240 passing the take-up position is greater by one than the number of sausage-shaped products S to be stored on said rod-like element R, with the additional transportation element 240 passing the take-up position after last sausage-shaped product S to be loaded on current rod-like element R has been taken up.

As can be seen in FIG. 3, the deceleration rate is lower than the acceleration rate, and the deceleration period holds up for half of the complete loading time. However, dependent on the number of sausage-shaped products S to be stored on a rod-like element R, the value of basic transportation speed BTS or enhanced transportation speed ETS, or any other factors influencing the transportation process, the deceleration rate may be selected to match the acceleration rate, or the deceleration period may hold up for a time period different from that shown in the example of FIG. 3.

It has been found that the value of enhanced transportation speed ETS is advantageously set to be about 30% higher than basic transportation speed BTS. This speed difference is applicable to a wide range of loading processes for loading rod-like elements R with different numbers of sausage-shaped products S at different basic transportation speeds BTS.

However, the increase in speed may be selected to other values which are higher or lower than said 30% of basic transportation speed BTS, like between 10% to 50% or 20% to 40%. The height of enhanced transportation speed ETS may depend on various factors, which allow a higher enhanced transportation speed ETS, or which require a lower enhanced transportation speed ETS.

In the method explained in conjunction with FIG. 3, only the speed of transport device 200 has been varied. In an alternative embodiment, it is also possible that the speed of screwed spindle 110 of infeed device 100 may be varied, e.g. decreased for holding back a sausage-shaped product S from being transferred onto connecting element 140, in order to enable a transportation element 240 to remain empty.

In this case, after the last sausage-shaped product S to be stored on rod-like element R has transferred from spindle 110 of infeed device 100 onto connecting element 140, basic feeding speed of infeed device 100 is increased. Thereby, that transportation element 240 following the transportation element 240 which has picked up the last sausage-shaped product S to be suspended on the rod-like element R, remains empty, by passing the upstream end of connecting element 140 before the suspension element L of the first sausage-shaped product S to be suspended on the next rod-like element R, has been transferred onto connecting element 140.

After that, the speed of infeed device 100 is increased up to a higher speed than basic feeding speed, in order to restore the initial positional relation between a transportation element 240 and a suspension element L to be caught by said transportation element 240.

Naturally, it is possible that both, the basic feeding speed of infeed device 100 and basic transportation speed BTS of transport device 200, in coordination with each other, may be varied. In this case, an increase in basic transportation speed BTS of transport device 200 and a decrease in basic feeding speed of infeed device 100 may be executed at the same time, followed by a coordinated decrease to basic transportation speed BTS of transportation and increase to basic feeding speed.

Furthermore, when varying the basic feeding speed of infeed device 100, basic transportation speed BTS may be accelerated, or may be decelerated, or a combination of acceleration and deceleration of basic feeding speed of infeed device 100 may be executed.

The invention is not limited to be executed on hanging line HL explained in conjunction with FIG. 2. The inventive method of loading rod-like elements R and discharging said rod-like elements R from a hanging line HL may be executed in any hanging line which comprises an infeed device 100 for feeding a sausage-shaped product S by its suspension element L to a take-up position, and a transport device 200 which picks up suspension element L from the take-up position and transports sausage-shaped product S to rod-like element R. It is only necessary that transport device 200 may be controlled independent from infeed device 100, at least with regard to its basic and/or enhanced transportation speed.

Furthermore, by the inventive method, not only sausage-shaped products, like sausages, may be stored on a rod-like element, like a smoking rod. Any kind of items which include suspension elements that can be picked up by a transportation element of a transport device, and which have to be stored on a rod-like element by their suspension elements, may be treated by the inventive method.

The invention claimed is:

1. A method for removing a rod-like element from a loading position of a hanging line in which the rod-like element can successively be loaded with sausage-shaped products, each of which contain a flowable filling material in a tubular or bag-shaped packaging casing provided with a suspension element through which the sausage-shaped products can be suspended on the rod-like element in the loading position, the method comprises the steps of:
feeding successively sausage-shaped products to a take-up position of the hanging line at a basic feeding speed;
taking up one sausage-shaped product being positioned in the take-up position, by one of several transportation elements of a transport device of the hanging line, the transportation elements circulating along a circulation path at a basic transportation speed;
loading by the transportation elements a predefined number of sausage-shaped products on the rod-like element being positioned in the loading position by the transportation elements;
replacing the loaded rod-like element by an empty rod-like element after the final sausage-shaped product has been suspended on said rod-like element;
varying the basic transportation speed of the transport device or the basic feeding speed, or both, after the final sausage-shaped product to be stored on the rod-like element has been picked up by a transportation element, such that the subsequent transportation element remains empty; and
setting back the varied transportation speed and/or the varied feeding speed to the basic transportation speed and/or the basic feeding speed during loading of the subsequent rod-like element.

2. The method according to claim 1,
wherein, after the final sausage-shaped product has been picked up, the basic transportation speed is increased to an enhanced transportation speed and wherein the enhanced transportation speed is decreased to the basic transportation speed during loading of the subsequent rod-like element.

3. The method according to claim 2,
wherein the basic transportation speed of the transport device is decreased during loading a predefined number of sausage-shaped products onto the replaced rod-like element to be loaded.

4. The method according to claim 2,
wherein the increase of the basic transportation speed is determined as a function of the distance between the transportation elements.

5. The method according to claim 2,
wherein the basic transportation speed of the transport device is increased to the enhanced transportation speed by about 10% to 50%, preferably by about 20% to 40%, more preferably by about 30% of the basic transportation speed.

6. The method according to claim 1,
wherein, after the final sausage-shaped product has been picked up, the basic feeding speed is decreased to a reduced feeding speed and wherein the reduced feeding speed is increased to the basic feeding speed during loading of the subsequent rod-like element.

7. The method according to claim 6,
wherein the decrease of the basic feeding speed is determined as a function of the distance between the transportation elements.

8. The method according to claim 1,
wherein the variation of either or both the basic transportation speed and the basic feeding speed occurs immediately after the final sausage-shaped product to be stored on the rod-like element being positioned in the loading position, has been picked up.

9. The method according to claim 1,
wherein the setting back of either or both of the varied transportation speed and the varied feeding speed to the basic transportation speed and/or the basic feeding speed occurs immediately after the loaded rod-like element has been replaced against an empty rod-like element.

10. The method according to claim 1,
wherein the sausage-shaped products are fed to the take-up position of the hanging line with a constant basic feeding speed during the loading process.

11. The method according to claim 1,
wherein the basic feeding speed varies during the loading process in accordance with the varying basic transportation speed of the transport device.

12. The method according to claim 1,
wherein, before starting the loading operation, the basic feeding speed and/or the basic transportation speed is set to a predefined basic feeding speed and/or a predefined basic transportation speed, preferably in accordance with the kind of sausage-shaped product to be loaded on the rod-like element.

13. The method according to claim 1,
wherein the basic feeding speed of the sausage-shaped products to the take-up position of the hanging line and the basic transportation speed of the transport device is synchronized with the production speed of a clipping machine arranged upstream the hanging line.

14. The method according to claim 1,
wherein a control device is provided which controls the transportation speed of the transport device and the feeding speed.

15. The method according to claim 1,
wherein an infeed device is provided, with which sausage-shaped products are successively fed to the take-up position of the hanging line.

* * * * *